Patented Oct. 26, 1937

2,097,252

UNITED STATES PATENT OFFICE 2,097,252

FOODSTUFF

Sidney Musher, New York, N. Y., assignor to Musher Foundation Incorporated, New York, N. Y., a corporation of New York No Drawing. Application July 2, 1934, Serial No. 733,517

13 Claims. (Cl. 99—163)

This invention relates to the utilization of cheap forms of vegetative matters in the production of edible products and their preservation, and is particularly concerned with the use of soya beans and soya bean materials as an ingredient in the manufacture of foodstuffs of a fatty nature.

Various grades of glyceride oils, both refined and virgin, treated and untreated, etc. have been utilized in the prior art, particularly in connection with glyceride oils and fats employed for food purposes. Such oils and fats whether treated or untreated, blended or unblended, are subject to deterioration and development of rancidity, which militates greatly against their utilization for many purposes, and their retention over substantial periods of time.

Furthermore such prior art oils and fats, even when of the blended type, are merely mixtures or blends of oils and fats having the characteristics of the resulting blend, which is a mere summation of the characteristics of the individual oils and fats that enter into the admixture.

In copending applications No. 698,543, Patent No. 2,069,265, granted February 2, 1937, and No. 710,727, Patent No. 2,049,017, patented July 28, 1936, there has been disclosed the utilization of oil bearing and non-oil bearing vegetative matters utilizable for materially slowing down or completely prohibiting the development of rancidity in fatty materials. Among the products that have been suggested are those derived from various seeds, nuts and fruits, particularly the oil containing varieties, and including sesame, sunflower, poppyseed, linseed, peanuts, cocoanuts, etc., grains, cereals, etc. The products may be employed either in the form of oils extracted from such stated materials, where such oils may be obtained, or in the form of crushed seeds, nuts, fruits, etc., or of seed cakes etc. Illustrating such disclosures by the utilization of sesame seed, crushed sesame seed without segregation of oil from the cake may, for example, be incorporated with the oil and/or fat to impart thereto remarkably improved keeping qualities, making the resulting products substantially resistant to development of rancidity and markedly changing the flavor and odor and other desirable characteristics of the products. In such treatment, the crushed sesame seed may be permitted to remain with the oil treated, or after relatively short treatment, such as for 15 minutes at moderate temperatures, such as approximately 150° F., the sesame seed fibers may be filtered off or otherwise removed from the treated oil, the latter exhibiting marked keeping qualities, modified flavor and odor, and yielding at the same time a seed cake of valuable edible characteristics not alone for the ordinary purposes for which seed cakes are employed, but also because of the manner of treatment, available for human consumption. The sesame seed in ground condition retaining the oil with the seed fiber may be added to the desired oil and/or fat in the amount of from 5 to 10% for example, and need not in any instance exceed 20% in the amount added, although of course higher quantities may be utilized if desired. Among the various types of oils and fats that may be treated there are disclosed cottonseed oil, such as winter pressed deodorized cottonseed salad oil, corn oil, refined deodorized 76° cocoanut oil, lard, tallow, oleo stearine, and similar oils and fats as well as the usual types of hydrogenated shortenings and compounds, paint oils, etc., etc. Such treated oils very markedly increase their resistance to the development of rancidity, show a marked decrease in the development of fatty acid content on standing, show improved taste and odor, show a far greater stabilization of color which occurs co-existent with stabilization of rancidity and which is of importance to the paint industry as well as from an edible standpoint, so that actually there are produced novel types of oils and/or fats, or mixtures thereof.

In the utilization of seeds, nuts or fruits as disclosed in those prior applications, these may be dehulled or deshelled as desired, as for example in the treatment of the sesame seed which may be subjected to the usual blanching operation to remove the shell or hull. Before grinding such blanched, or dehulled or deshelled nuts, they may be dried preferably at relatively low or only moderate temperatures, such as 150° F. Of course, higher temperatures yield a slight roast, but temperatures are employed desirably which are insufficient to give the seed or nut a burnt flavor, such temperatures however being sufficient to break down the shell structure, and aid in the removal of moisture, while retaining all of the sweetness of the original seed or nut. Higher temperatures may be employed where a burnt flavor is desired, but this is not necessary, nor even generally desirable in carrying out the stated invention. As noted, the utilization of the invention is not limited to the treatment of edible gylceride oils and fats, or mixtures of them, or blends, but may be utilized in various other ways to prevent the development of rancidity and to give new properties, such as in the production of super-fatted soaps or milled soaps, in the treatment of butter or other milk products containing proportions of butter fat, in the treatment of paint oils, coffee, in the treatment of tobacco and tobacco products where the flavor possessed by certain of these crushed seeds is so desirable to be imparted to such tobacco products, in the ageing of spiritous liquors, etc.

In the present invention, there is particularly employed cheap forms of vegetative materials, and particularly soya beans or soya bean cakes. The soya bean industry is an extensive one, and has reached a place of substantial importance in the United States, particularly in Illinois and Indiana, where large quantities of soya beans are grown today.

For many years soya beans themselves have been recognized as having food value, and in China, for instance, they have been used not only for the oil pressed from them, but also in the manufacture of many varieties of products, including soya bean cheese, soya bean flour, soya bean milk, etc.

In China and Manchuria before the advent of expensive oil pressing equipment, the soya beans were used in whole form, different cultures and water being added thereto to produce various products referred to. But in more recent years, both abroad and in this country, soya beans have practically entirely been crushed by means of hydraulic presses or Anderson expellers to remove the oil, which oil is considered of value on the one hand for use in paints because of its semi-drying character, and on the other hand for edible purposes, although in the latter case even after it has been highly refined and deodorized, it has a strong tendency to revert in flavor and odor to an "objectionable fishiness" that will never permit it to reach a place of substantial value as compared with other edible vegetable oils, despite some of its characteristics that are desirable, including its better emulsification value and higher drying qualities.

In the prior art, the cake left over after the expression of the oil has been ground and sold for cattle food or poultry food or even for fertilizer purposes, in all cases recognizing its high nitrogen content and high food value. More recently products have been marketed obtained by bleaching and highly refining the cake left over from the pressing operation to produce a product of improved color, odor and taste, and of lower fat content.

There has never been recognition, however, in the prior art, and no utilization has been made based on the discovery that these various soya bean products exclusive of the pressed soya bean oil itself, have particular value in preventing development of rancidity in conjunction with various glyceride oils and/or fats, or mixtures of blends thereof or fat products normally having a tendency to turn rancid, nor of other important features which make soya bean products available for a number of purposes not hitherto recognized in the art, as more particularly described below.

Among the objects of the present invention is the utilization of cheap forms of vegetative matters, such as soya beans or soya bean cakes, the bulk of which types of products hitherto in the art have been utilized for cattle food or poultry food.

A further object of the present invention is the utilization of such soya bean materials for the substantial inhibition of rancidity in lard and other fatty products.

A still further object is the retention of the freshly rendered lard flavor by the use of such soya bean material, and the transference of this freshly rendered flavor to products with which it is used.

A still further object includes the utilization of the emulsification value and gummy characteristics of the soya bean products in fatty products when used for baking or mayonnaise manufacturing purposes, in which cases emulsification is an important consideration.

A further object includes the production of food products in which slightly roasted soya beans are a constituent, and which products have a substantially new and pleasant flavor hitherto not related and not recognized in the use of soya bean materials.

A still further object includes the retention of fine food values which soya bean materials normally have without any of the objectionable fishiness that is developed in raw soya bean products, and which has hitherto made it necessary to highly refine such soya bean products before they could be made available for human consumption, and which did not solve the problem completely.

And still further objects relate to the use of these soya bean materials wherein the entire product is employed for edible purposes without requiring the separation of the oil from the meal, and making such products available for mayonnaise manufacture and related purposes.

Still further objects and advantages of the present invention will appear from the more detailed description set forth below, it being understood however that this more detailed description is given by way of illustration and explanation only, and not by way of limitation, since various changes may be made therein by those skilled in the art without departing from the scope and spirit of the present invention.

The utilization of such cheap vegetative material in accordance with the present invention will be particularly illustrated by the utilization of soya bean material.

In the utilization of the soya bean material, a number of variant types of soya bean products may be employed. For instance, the whole dried ground soya bean may be used, or the soya bean cake from which the oil has been expelled may be employed, or there may be utilized the highly refined, bleached soya bean flour, or other available forms of soya bean material may be employed in accordance with the present invention. It has been found that the kind of soya bean material used exhibits different activities from an anti-oxidant point of view, or an emulsification point of view. The utilization of the soya bean material for illustration of the present invention is particularly set forth in connection with animal fats, and particularly those of the lard type. Lard is one of the principal fat products in the United States, holding its position in the trade largely as a result of certain specific characteristics as a shortening agent that it possesses, which are not normally available in other edible fats. From the standpoint of flavor, lard is used extensively in the baking of bread and in the manufacture of pretzels, cakes, and crackers. The fine flavor given to these products by the use of lard cannot be produced with the use of the ordinary available odorless and tasteless fully refined vegetable fats. In addition, it should be borne in mind that lard is in demand for the biscuit and cracker manufacturer because it has approximately 20% more shortening value than fully hydrogenated cottonseed oil shortening.

But lard has relatively poor keeping qualities, and this militates against its utilization, and is largely explanatory of the price factor which must be taken into consideration in these utilizations. Were it not for the fact that lard itself has such poor keeping qualities, it would undoubtedly bring even a premium over fully hydrogenated cottonseed oil shortening, whereas the conditions today in the market are just the reverse. The keeping qualities of the lard, or rather its absence of desirable keeping qualities is a very important consideration. Freshly rendered lard flavor is totally different from that which develops after the lard ages, even before objectionable rancidity has set in. This pre-rancidity state kills the fine freshly rendered lard aroma and flavor, so that even if lard is used thirty days or forty-five days after it has been rendered, its flavor is in no way equal to the original flavor characteristics.

Further it should be borne in mind that meat packers today are placing on the market, unbleached lard or even grades of what might be called "virgin" lard, which is rendered at low temperatures, so that somewhat better keeping qualities are possessed by such grades of lard, than that of the bulk of the lard normally available on the market. It has been well recognized scientifically that rancidity in fats and oils is not only objectionable from a flavor standpoint, but physiologically produces harmful results. Recently it has been determined that even before rancidity could be detected by odor or flavor in such a product as lard that it had already lost a substantial amount of its nutritive qualities from the standpoint of physiological value. All these factors bring out the importance of the stabilization of those fats which have a tendency to turn rancid quickly and which include all of the animal fats, such as lard, tallow, oleo stearine, butter fat, etc., and as well vegetable oils and fats which, although they turn rancid on the average more slowly than the animal fats, yet reach the same stage of rancidity and produce the same harmful results, eventually becoming poisonous to the human system. These better grades of lard are, however, available in but small quantities, and in no way solve the problems of the art since the bulk of the lard sold to the American public and exported will turn rancid within a relatively short period of time.

Attempts to overcome the instability or lack of keeping qualities in lard have been made in the prior art, but these have involved the addition or inclusion of so-called stabilizers which are injurious to health and undesirable for other reasons.

The present invention teaches the utilization of soya bean material and related products as indicated above, for the protection of the lard and other animal fats or vegetable fats and oils, etc. by the utilization of entirely wholesome products that are safe, edible and clean.

In illustrating this invention employing the entire soya bean material for the protection of lard, the following example will suffice. Whole, dried, decorticated soya beans pulverized into a flour are added to ordinary lard at a temperature relatively low, but sufficient to maintain the lard in a substantially liquid or semi-liquid condition, so that infusion of the lard with the soya bean material takes place. For this purpose, the quantity of soya bean material employed may vary, and may for example include the addition of about 5% of the soya bean material with 95% of the ordinary lard. The temperature employed may, for example, be approximately 140° F. The treatment is continued, as for example for about 30 minutes, in order to permit a thorough intermingling of the flour with the fat, and to produce the desired infusion.

The resulting product after treatment may be cooled and packaged in the usual manner for packaging lard, particularly where the product is to be utilized for the bakery trade, and where the presence of the meal would not prove objectionable. Where, however, desired the meal may be filtered or centrifuged from the treated fat. The resultant lard product still possesses the desired characteristics indicated above, while the recovered meal is available for use as desired.

Desirably the soya bean product is ground into as fine a condition as possible, so that a maximum area thereof may be exposed to the action of the oil, but the soya bean material may, of course, be in any desired condition. If desired, a concentrated mixture of approximately 50% of soya bean flour and 50% soya fat may be utilized to produce a paste-like mass, which product may then be utilized, and has more effect than if the same relative quantity of the flour itself were to be used, primarily because of the fact that a better intermingling of the flour and the fat is thus obtained.

The conditions of the above example are not limiting but variations in the process may readily be carried out. For example, the animal fat, such as lard, will be given substantial rancidity protection if the meal is allowed to be infused with the fat for say 15 minutes at 150° F., with subsequent filtration of the meal fibers from the treated fat, the fat under such conditions showing pronounced rancidity protection, and for use, for example, for frying purposes, or other analogous purpose where the presence of the meal itself would be objectionable. But as noted, in all these cases it is not necessary to remove the meal or fibers of the material unless some particular use for which the product is adapted requires such elimination of the fibrous material.

The invention is not limited to any particular type of soya bean, or soya bean cake, but may be carried out by utilization of soya bean products in general, including whole soya beans, soya bean cake, refined and/or extracted soya bean flour, etc.

Nor is it necessary to produce a direct infusion of the desired fat to be treated with the soya bean product, since the soya bean product may be infused with other products and then admixed with the desired animal fat or oil, for example, for development of the desired characteristics, or extractions of the soya bean material may be made with solvents, including volatile solvents, and then utilized for incorporation with the desired fat or oil, whether animal or other character. Thus an infusion can be made of a fat with the soya bean product, followed by a filtration of the meal from the treated fat, and thus utilizing such treated fat in conjunction with another fat or oil which it is desired to protect from rancidity. Such a method is not, however, considered as satisfactory as direct infusion of the particular fat or oil which it is desired to protect, but such methods may be employed in preparing concentrates for treatment of other fats and oils.

In the utilization of the soya bean material as noted, that material may be in any desired form, and whole soya beans need not necessarily be employed, but the soya bean cake may be utilized. Thus the cake from the Anderson expeller, which cake would have a fat content of between 3 and 5% is highly desirable, and can be satisfactorily used in this manner rather than as cattle food for which it is normally used at the present time; and further such cake does not develop any of the objectionable fishiness referred to above.

The utilization of the soya bean material, even in the small quantities indicated, in connection with the fat and oil preparation, give to the latter certain desirable mucilaginous and gummy characteristics, which make them highly desirable for bread baking or cake baking, or even for the manufacture of mayonnaise when incorporated with oil instead of with an animal fat like lard. For example, it has been found that the utilization of 2½% of crushed soya beans or soya bean cake in cottonseed oil, when used for mayonnaise manufacture, makes it possible to reduce substantially the amount of egg required to obtain the same emulsification value.

It has been noted above that soya bean itself has a tendency to develop in the course of time an objectionable fishiness that is characteristic of soya bean oil, which is particularly true when the product is allowed to remain in contact with moisture for any long period of time. It has been found that giving soya bean or soya bean material a slight roast entirely eliminates this tendency to the development of any fishiness, and that it will not recur within a reasonable period of time. This roast treatment may be carried out in any one of several different manners. For instance the soya beans themselves may be placed in an ordinary roller drum and subjected to a roasting similar to the roasting of corn or the dry roasting of peanuts. This is something more than a mere partial dehydration as it seems to change the entire flavor of the soya bean, producing a totally new and different product. If the original soya bean has been put through an Anderson expeller by means of which most of the soya bean oil has been expressed from it, the resultant cake may be given a roast by direct exposure to heat and subsequently powdered for use in the manner described and this product will develop none of the objectionable fishiness of the whole soya bean.

This roast treatment need not be extensive but may involve subjection of the soya bean material to a low flame or direct heat at a temperature of about 300° F. for 20 to 30 minutes, keeping the soya beans constantly stirred so that they will be given a roast or browning effect and not become too greatly carbonized or burnt.

Further, it has been found that a paste may be made of such slightly roasted whole soya beans or other soya bean materials such as the expeller press cake whether given a further roast or not or even of the partially expressed press cake wherein the soya bean oil content is reduced from about 20% to about 10%, together with a small quantity of liquid oil or shortening, either preparatory to using it in lard or other fat or oil operation for the purposes set forth above, or in making a paste with the expeller pressed cake after the oil is given out of the soya beans, and such paste produced from such soya bean material with added oil produces an unusually desirable spread for bread and other purposes, being similar in flavor characteristics to peanut butter or products of that general nature.

This opens the field for an entirely new variety of spreads of this nature whereby such cheaper materials like soya beans and seeds may be employed with other fats and possessing certain more desirable characteristics other than flavor alone, such as a higher protein content, etc., than possessed by peanut butter alone.

Such finely ground and partially roasted soya bean materials may also be excellently employed as a coffee substitute either by means of blending with other crushed seeds or alone, and may be used just as coffee is used as a special type of drink, producing new flavors and not having any of the objectionable characteristics that coffee possesses in the form of its alkaloidal structure. In this form the partially roasted soya bean may be blended, for instance, with partially roasted sesame seeds or similar products to produce novel types of flavor as a health drink.

Similarly it is possible to transfer the infused properties of these crushed seeds such as soya beans into products where flavor qualities are essential, but in the non-edible field. For instance, the sweetness and nuttiness required for tobacco, whether for the cigar, cigarette, or pipe tobacco manufacturer, may be obtained by means of infusing tobacco leaves with these crushed seeds or extracts of these crushed seeds, imparting such sweetness and nuttiness to the tobacco leaves and at the same time imparting to the fat normally occurring in such crushed seeds, which fat is subsequently pressed out in order to leave the tobacco leaves as near fat-free as possible, the anti-oxidant qualities of the natural vegetation materials such as are described in this invention. In this case, therefore, the infusion serves a two fold purpose, namely, that of imparting flavor to the tobacco leaves and also that of imparting better keeping qualities to the fat which is later used.

In addition, whole roasted soya beans or other roasted beans may be utilized to manufacture a product such as an oven baked bean without the expensive operations that are necessary today for exposing the soaked and cooked beans to an open flame for baking purposes. The baking of beans first and using them subsequently for soaking and cooking is the easiest operation possible as against the more expensive operation employed today.

With regard to the utilization of highly refined bleached soya bean flour in the production of bread type products, it has been found in accordance with the present invention that if the flour be incorporated directly into the fat, and as a part of the fat ingredient and utilized as such in the production of such bread type products, that substantially less of the flour is required to obtain equivalent results. Furthermore, it has been found in this connection that if instead of using highly refined bleached soya bean flour as suggested, whole crushed soya beans are utilized with the fat, that equivalent results can be obtained with only one-half to two-thirds as much flour as has heretofore been found to be necessary in the use of the highly refined bleached soya bean flour, which result is of importance in view of the fact that the whole ground soya bean is considerably cheaper in cost than the highly refined, bleached soya bean flour commonly available.

While the invention has been particularly emphasized in connection with the protection of an animal fat or oil, such as lard, it has other wide use in connection with other fats and oils which normally have a tendency to turn rancid, such as cottonseed oil, corn oil, sunflower oil, peanut oil, oleo oil, tallow, oleo stearine, cocoanut oil, linseed oil, China-wood oil, etc.

In the production of the paste types of products, such as those referred to above, one method that can be desirably employed is to take a seed product like soya beans where the fat content is less than 25%, crush the soya beans or similar material into powder form, and then admix a small quantity of oil with the powdered soya beans, and finally send the combination through a colloid mill in order to finely disperse all particles of the meal into the oil. A pasty mass of satisfactory characteristics is thus obtained.

In utilizing the present invention, it is not necessary to treat individual oils in accordance with the present procedure, but mixtures of oils or mixtures of the substances employed for producing the protection of the oils or fats or blends or mixtures of the same may be employed. Thus several materials of the vegetative character which produce the tendency toward development of rancidity may be employed in combination. Of course, in all such cases the taste and flavor will be dependent upon the character of material employed in producing the treated oil and/or fat, or mixtures or blends of the same.

While the utilization of soya bean material has been particularly emphasized above, the invention is not limited to the use of soya material alone, but desirable results have been obtained with analogous types of materials including for example, oatmeal, corn germs, corn cake, whole wheat, castor bean pomace, maple tree leaves, etc.

And it should be noted that substantial protection against rancidity is obtained with many of the oils by treating such oils with the seed or stock material of the same nature as that from which the oil has been derived, utilizing the seed or stock in its original condition. For example, corn oil may be infused under conditions analogous to that set forth above with materials other than soya beans and the materials set forth above, in that for example, such corn oil may be treated by infusion with corn germs. For example a mixture of 90% corn with 10% of crushed corn germs may be employed under conditions similar to those referred to above in the specific examples employing soya bean materials, with or without subsequent filtration of the corn germ solids. The resulting treated corn oil is materially improved in keeping qualities.

Similarly, soya bean oil may be infused with a crushed soya bean product and materially improved in that way in its keeping qualities. For some purposes, where corn oil or soya bean oil, for example, is employed, it is desirable to utilize the same type of product for infusion purposes as was utilized in producing the oil itself, so that a corn oil, for example, instead of being treated with soya beans or sesame seeds, etc. may desirably be treated with the corn germs, so that a final product that is still 100% corn product type may be employed, and analogously the same thing holds for the treatment of soya bean oil, which may be protected by the use of corn germs or sesame seeds, etc., but desirably is produced under these circumstances with soya bean material, so that the resulting soya oil is desirably a 100% soya bean product.

It should be noted that the results obtained in such cases where corn oil is infused with crushed corn germs, or soya bean oil is infused with soya bean material, that a marked change in keeping qualities of the oil is obtained over the corn oil or soya bean oil as found on the market today. In such cases, for example, there may be employed not more than 25% of seeds with 75% of the oil, such as 25% of soya bean material with 75% of soya bean oil in producing products in accordance with this phase of the invention.

The choice of materials as a source of the antioxidant property for preventing development of rancidity, may depend in some instances on the nature of the particular product that is to be protected, and the utility to which it is to be put. For example, in connection with lard, while the lard is adequately protected by the use of soya bean flour, for example, as illustrated above, in some instances some slight color change may be detected in a lard which has been treated with the soya bean material. For some purposes, such lard protected by the use of soya bean material and with some slight color change, is utilizable regardless of such slight color change as, for example, in connection with the bakery trade. Where, however, any such color change is undesirable, one of the other vegetative materials may be utilized, and for example, the lard may be protected by the use of oatmeal flour in lieu of soya bean flour, and substantially the same or very nearly the same protecting anti-oxidant qualities will be given to the lard by the use of the oatmeal flour as is obtained by the use of the soya bean flour without, however, producing any substantial difference in color whatsoever, so that for household use oatmeal flour may be a preferable ingredient to employ in the protection of the lard than the soya bean material. While the oatmeal flour has almost as great anti-oxidant qualities as the soya bean flour, it does not of course possess the same emulsifying and gummy characteristics as soya bean material has, as explained above, and which is particularly desirable for certain usage.

A large number of tests have been made to show the efficacy of these materials in protecting the various oils and fats against development of rancidity. It has been found, for example, that lard is given about two to three times its keeping quality by adding 5% decorticated and partially dehydrated soya bean flour, and filtering off the flour after infusion, and that it is furthermore given eight to nine times the keeping quality by allowing the meal to remain in contact with the fat.

As showing specifically the effects obtained by the use of soya bean material in protecting lard, for example, against development of rancidity, the following example is given:

Lard was taken which showed a titration for rancidity of 2.1, and was subjected to a temperature of 105° C. for 6 hours with the following results:

| | Titration |
|---|---|
| Control lard | 14.7 |
| Lard containing 5% crushed raw soya beans | 2.3 |
| Lard containing 3¾% raw crushed soya beans and 3¾% cottonseed salad oil, first made up into paste | 1.1 |
| Lard containing 5% highly refined bleached soya bean flour | 11.1 |

It will be noticed from this example that the paste consisting of only 3¾% of raw crushed soya beans shows a higher anti-oxidant effect than 5% of the crushed flour. This may be predicated on the fact that the meal itself is better exposed and able to give its anti-oxidant effect to the lard.

In another series of tests, the following comparative results were obtained, with regard to keeping quality of lard. Bleached refined lard without any anti-oxidant was found to have a keeping characteristics of four hours; the same bleached, refined lard with 5% of soya bean flour showed a keeping quality of twenty-seven hours. Prime steam lard without anti-oxidant showed a keeping quality of ten hours, as against a keeping quality in the presence of soya bean flour of thirty-one hours.

As showing the comparative effects of soya bean material as compared with sesame seed material, the following results were noted in connection with lard. The samples were kept at 105° C. for six hours and titrated, and the following results obtained:

|  | Titration |
|---|---|
| Lard straight | 25.8 |
| Lard plus each of the following: | |
| 7½% blanched crushed sesame seed | 8.6 |
| 7½% unblanched crushed sesame seed | 5.8 |
| 7½% mixture of one-half blanched crushed sesame seed, and one-half unblanched soya beans | 4.3 |
| 7½% sesame meal left after expression of the oil | 10.9 |

This example shows first that unblanched crushed sesame seed is somewhat superior to blanched crushed sesame seed; and second, that crushed soya beans which cost about one-half as much as unblanched sesame seed are even more active than the latter in the anti-oxidant activity.

The following additional results have been obtained in connection with the protection of lard against development of rancidity by the use of soya bean material.

Unblanched lard tested for rancidity by peroxide test became rancid in 10 hours. Unblanched lard, plus 5% powdered expeller press cake made from decorticated soya beans having an oil content of 5% became rancid in twenty hours. Unblanched lard, plus 5% powdered decorticated soya beans with an oil content of 20% became rancid in about 34 hours. These results would indicate that not only is the lard excellently stabilized by the use of such soya bean materials, but it should be noted that the indication is the less treatment given the soya beans, the greater is the activity. The only difference between the two flours used in the above example was that the first had its oil pressed out down to about 5% by means of Anderson expellers, whereas the other retained its original soya bean oil content of approximately 20%.

It may be noted in connection with the utilization of the soya bean material in protecting such oils against the development of rancidity that soya bean oil itself has very poor keeping qualities, so that there can be no question about the soya bean oil present in the thirty-four hour product giving the extra stability, since one would normally expect that it would harm the keeping quality of the lard rather than improve it in view of the fact that the soya bean oil itself is so unstable. In spite of such a priori conclusions, leaving the soya beans as nearly untouched as possible with their full oil content gives them a much greater value of stabilization contrary to what would be expected for reasons given above. It should also be noted that the whole soya bean has much greater emulsification value than the expeller press cake soya bean, which can be easily noted by tests of the relative materials. The tests show that the whole soya bean material, which may for example be employed as a soya bean flour, will have its full emulsification value or maximum value of that character, and will be approximately not less than 3 times as active as a refined, bleached soya bean flour, particularly when incorporated into the fat material. In order to summarize forcefully the effects obtained in the protection of lard, it may be noted that the ordinary grade of bleached lard purchased through the retail stores, lasted on an average under the tests given in the last noted example above, of an average of three hours, whereas by the use of 5% of the soya bean materials, its life can be extended to not less than twenty-five hours.

Hydrogenated lard products which have recently come on the market may also be desirably treated and improved in accordance with the present process by the utilization of the vegetative materials and particularly soya bean material. Such hydrogenated lard products as have appeared on the market have during the hydrogenation operation lost approximately 20% of their original shortening value. Such deodorized or hydrogenated lards, may, in accordance with the present invention, be incorporated with soya bean material, such as 5% of the soya bean flour as noted above to produce a fat which has not materially changed from the standpoint of odor and taste, but which has a better shortening value than it possessed in the form of a straight hydrogenated lard and in addition at no extra cost in view of the fact that the soya bean material actually costs a great deal less than the lard itself, and at the same time producing a product of the desirable emulsification value and also having keeping qualities that are even in excess of the original hydrogenated lard.

In the event, of course, that it is desired to impart a fine flavor to the deodorized, hydrogenated lard, crushed sesame seed may be used as against soya beans, the crushed sesame seed in this case passing on the desirable sweet and nutty flavor characteristics to the lard and at the same time giving it better keeping qualities.

In addition, there are cases where the lard is undesirable because of its lard flavor characteristics, which flavor is, of course, a matter of personal opinion. It has not been found possible to deodorize the ordinarily available lard because such deodorized lard would have very poor keeping qualities. Under this process it is possible to deodorize lard and infuse such deodorized lard with a small percentage of one of these crushed seeds or other vegetative matters which would not materially change its blandness in flavor but which would overcome the undesirable feature of the lack of keeping quality and give it sufficient life so that it can satisfactorily and commercially be used. Estimating this life on the basis of the peroxide test, while ordinary bleached household lard has a life of about three hours, the deodorized lard made from this bleached lard would have a life of about 1½ hours, whereas this same deodorized lard containing 5% of whole crushed soya beans would have a life of from 10 to 12 hours.

As noted, the considerations involved in the utilization of soya beans and related materials for the protection of oils against rancidity, while particularly important in connection with animal fats like lard, have also application to many other oils and fats as the following examples illustrate. The samples were kept at a temperature of about 105 C. for 6 hours and titrated with the following results:

| | Titration |
|---|---|
| Hydrogenated cottonseed oil | 32.7 |
| Hydrogenated cottonseed oil plus each of the following: | |
| 7½% blanched crushed sesame seed | 19.1 |
| 7½% unblanched crushed sesame seed | 1.9 |
| 7½% of one-half blanched crushed sesame seed, and one-half unblanched soya beans | 2.2 |
| 7½% sesame meal left after expression of the oil | 17.2 |

Again these results indicate the superiority of unblanched crushed sesame seed over blanched crushed sesame seed, but at the same time show that the crushed soya beans costing about one-half as much as unblanched sesame seeds, are almost as active in their anti-oxidant activity.

Considering cottonseed oil protected by soya bean material alone the following is noted. The samples were kept for 18 hours at 180° F. and titrated.

| | Titration |
|---|---|
| Control hydrogenated cottonseed oil | 29.9 |
| Hydrogenated cottonseed plus 5% ground soya beans | 2.6 |
| Hydrogenated cottonseed oil plus 3¾% ground soya beans | 3.9 |
| Hydrogenated cottonseed oil with 5% blanched, refined soya bean flour | 14.7 |

Similarly cocoanut oil has given the following specific results:

*Cocoanut oil at 105° C. for 6 hours*

| | Odor | Kreis test | Titration |
|---|---|---|---|
| Straight cocoanut oil | Rancid | Positive | 13.7 |
| Plus 7½% oatmeal unfiltered | Not rancid | Negative | 0. |

*Cocoanut oil at 105° C. for 6 hours*

| | Odor | Kreis test | Titration |
|---|---|---|---|
| Straight cocoanut oil | Rancid | Positive | 18.2 |
| Plus 7½% crushed sesame seed unfiltered | Not rancid | Negative | 1.7 |
| Plus 7½% half crushed soya beans and half crushed sesame unfiltered. | Not rancid | Negative | .8 |
| Plus 7½% flour unfiltered | Not rancid | Negative | 1.5 |
| Plus 7½% oatmeal unfiltered | Not rancid | Negative | .7 |
| Plus 7½% whole wheat unfiltered | Not rancid | Negative | 1.3 |

As illustrating the utilization of solvent extracts of seeds or other materials for their anti-oxidant effect, the following results with cocoanut oil were noted, the treatments being carried out for 18 hours at 180° F. The original cocoanut oil showed a titration at the end of that time of 8.0. Cocoanut oil plus 7½% of the alcoholic extract of sesame meal (the liquid part) showed a titration of 2.5. Cocoanut oil plus 7½% castor bean pomace after alcoholic extraction showed a titration of 2.0. These examples show that extracts of the vegetative materials may be employed in the protection of oils against the development of rancidity. And they further show that the meal itself which otherwise goes for fertilizing purposes has a definite anti-oxidant effect, just as sesame meal after the oil has been taken from it still has an anti-oxidant value. In fact, ordinary wheat flour has been tested, and has been found to have some anti-oxidant effect, which may be incorporated into an oil or fat by infusion, etc. as noted above.

The oils and/or fats obtained in accordance with the present disclosure exhibit distinctive flavors entirely unlike the ordinary oils available on the market or even mere blends of available oils. The keeping qualities of the infused oils and/or fats are far superior to those of even the best grades of oils on the market, they keep without any substantial rancidity for from two to three and much longer times than blends of the oils available on the market and not made by infusion or similar treatment in accordance with the present invention.

As noted, the treated oils and/or fats may be utilized without removal of the seed fibers therefrom, unless the particular use to which the oil and/or fat is to be put, requires such removal of fibers, but it is quite remarkable and noteworthy that the removal of the seed fibers or seed cake from the treated oil leaves a residual oil of noteworthy characteristics as to flavor, taste, odor and keeping qualities as indicated above.

The recovered seed cakes or fiber cakes, as the case may be, are desirable products that have greatly superior properties from an edible standpoint, much more so than does the ordinary seed or fiber cakes remaining by crushing seeds, for example, for removal of oil. Such superiority of the recovered seed or fiber cakes in accordance with the present invention may be due to the fact that oil still remains in such seed or fiber cakes, and the product is essentially distinct in characteristics, therefore, from the ordinary seed or fiber cakes remaining after the crushing of seed to produce oils, for example. Such modified characteristics of the seed or fiber cakes resulting from the present invention are due in part to the fact that not only is there residual oil in such seed or fiber cakes, which oil has not been removed, but part of the original oil present in such seeds has been replaced by the oil or fat that has been employed in the treatments referred to, thus giving novel types of seed cakes. Such seed or fiber cakes after separation from the oil undergoing treatment may of course be utilized by pressing or otherwise to remove additional quantities of oil therefrom.

The oils and/or fats resulting from treatment in accordance with the present invention may be utilized for blending with other oils and/or fats and to impart thereto characteristics obtained as a result of the infusion or similar method set forth herein. Other methods of making extracts of the desirable constituents of the seeds, nuts, or fruits may be utilized as, for example, by treatment of the crushed seeds, etc. by volatile or other solvents which are then incorporated with the desired oils and/or fats, and which method has been specifically illustrated in some of the particular examples given above. But desirably the process is carried out by direct infusion of the seed, etc. with the edible oil or fat as explained above.

In accordance with the present invention, there is utilized the ability to transfer from one fat to another, from a seed to a fat, etc. any specific or general property of the infusible crushed seeds or other vegetative materials, whether these characteristics have to do with flavors, odors, gummy characteristics, or water retention properties, as instances of what may be transferred through this transfusion process.

In this manner there is opened a field for an entirely new set of fat products having properties or characteristics not heretofore possible. For instance the use of soya bean flour in lard when properly infused transfers to the lard qualities of water retention and emulsification properties notably lacking in lard itself and which make such infused product far more desirable in the baking of bread and for other baked products wherein such moisture retention and emulsification properties are factors. Similarly, many other characteristics may be transferred and this is merely an example of what may take place by means of this infusion process.

While the use of this invention has been particularly emphasized above in connection with edible oils and fats, and particularly animal fats like lard, it is not limited in its application that way, but may be utilized in connection with the modification of properties of oils and fats other than edible oils, and also and particularly to prevent rancidity or to inhibit the development of rancidity in various types of oils and fats other than edible varieties. For example, the invention may be utilized in connection with prevention of rancidity in coffee due to changes in the oil present in the coffee bean. The crushed seed, fruit or nut, as desired, may be added to the coffee beans during roasting and grinding operations or in any other way brought into intimate contact with the coffee oil in order to protect such oil against development of rancidity. Or if desired, the roasted coffee beans might be treated with an extract of crushed seed, fruit or nut containing the substances which tend to inhibit development of rancidity in oils.

As a further example of the utilization of the invention in connection with non-edible products, reference may be made to the prevention of development of rancidity in the so-called superfatted soaps. A small quantity of the crushed seeds, fruit or nuts or extracts thereof may be added to the soap composition either in the crutcher or just before the finishing of the soap, yielding products which tend to prevent the development of rancidity that make such superfatted soaps free from their usual tendency toward or danger of development of rancidity.

The treatment of the oils and/or fats as set forth above, either by actual incorporation of the seed, fruit or nut product into the oil, or by extraction from such seed, fruit or nut by means of the oil, imparts to the oil and/or fat substantial protection against the development of rancidity. It is believed that such protection is obtained by actual transfer of substances from the seed, fruit or nut to the oil and/or fat which is treated. For example, it has been found that much more satisfactory results are obtained by the methods set forth above than is secured by crushing oil from the seed, nut or fruit products and utilizing such oil for admixture with the oil to be treated. It is preferred, therefore, in imparting the properties of resisting rancidity to edible oils or other oils, to utilize either the actual incorporation of the crushed seed, fruit or nut with the edible or similar oil, or to utilize the edible or similar oil which is to be protected against rancidity, as the medium for making the extraction of desirable substances from the seed, fruit or nut. While, as noted above, it is believed that such protection is obtained by actual transfer of substances from the seed, fruit or nut to the oil or fat which is treated, for present purposes, it is immaterial what the basis of that protection is, since by carrying out the invention as set forth herein, actual protection is thus secured.

And as noted, it is not only that the anti-rancidifying substances which are removed from the very cake itself and transferred into the oil normally subject to rancidity, so that the resulting product is substantially free from the objectionable feature that edible oils and fats normally exhibit, but such treated oils also exhibit the peculiarly pleasant, sweet odor and flavor that is obtained as the result of the addition of or infusion from the seed, fruit or nut. This is well illustrated by the fact that fully hydrogenated shortenings containing these infusions or otherwise modified in accordance with this invention have provoked the comments of users that such materials exhibit a fine, freshly rendered lard odor without any of the objectionable characteristics that lard usually takes on. This is important since lard itself and the odor of lard is usually looked upon as being desirable in the production of a desirable finished product as a baking compound.

Further it should be noted that the teachings of the present invention may be utilized desirably in connection with animal fats and oils, and particularly lard which has been emphasized above, and which may be infused or otherwise treated with the seed, nut or fruit products in accordance with the present invention to yield a final modified lard or similar product of superior keeping qualities, superior not only to lard ordinarily, but even to that of the cottonseed oil products. The importance of this is shown by the fact that the lard industry for the past ten years has been seriously affected by two factors, the first that the use of vegetable products has been increasing, and second, because although the shortening value of lard is recognized as superior to similar vegetable oil products—meaning by shortening value, creaming quality, water absorption, and similar facts that influence cake baking, pie baking, etc.—the keeping quality of lard is so much inferior that it can be employed only for the cheaper type of commodities. This is one reason at least why lard today is selling at a price from 25 to 30% under that of the fully hydrogenated fat and seed shortenings. The infusion of the lard with the seed, nut or fruit products, or the incorporation of the seed, nut or fruit material with the lard, in accordance with the present invention, yields a lard of far superior keeping qualities as noted above, with only a very nominal and small increase in cost of production. It has been found, for example, that the rancidity of lard is substantially stopped by two or three times the period that normal rancidity will develop without the treatments set forth herein. Using as little as 3% of the crushed oil meal without filtering off the meal will reduce the tendency to rancidity by double the period of time than if the cake were removed by filtration.

The invention may similarly be applied to butter. And further it should be noted that butter oil itself, as distinguished from ordinary butter, which butter oil ordinarily develops a strong rancid-like odor within three hours when placed in an incubator at 180° F., if first treated with as little as a 3% infusion in accordance with the present invention, yields a butter oil that does not show any such rancid-like odor, even after fifteen hours treatment at the temperatures stated.

It has been found that a small percentage of oil cake contains such a substantial concentration of those substances that inhibit rancidity, that it may be used and reused without substantially diminishing its activity. Illustrating this feature, after infusion of an oil cake in cottonseed oil shortening, and after subsequent filtration of the oil cake, rancidity will have been inhibited in the cottonseed oil shortening to a noticeable degree.

Consequently the residuary cake may be used again, but this second time in order to gain its maximum protection, it should be allowed to remain in contact with the shortening, so that when used for baking or similar purposes, the intimate contact of the meal with the fat will act in a more concentrated form to protect the shortening from rancidity. By adopting this method the oil cake becomes less expensive to use, since it may first be used for ordinary infusion and subsequent filtration, and may secondly be used where filtration of the meal is not required.

In carrying out the present invention, the infusion or other treatment of the desired fat or oil with the seed, grain, fruit, nut, leaf, etc. that is used, should, of course, be carried out under conditions particularly as to temperature that enable the transfer of desired properties and characteristics to take place. Usually a moderate temperature as up to 150° F. will be sufficient. The temperature must be high enough to obtain the result referred to for a given time treatment, and the warmer temperatures usually markedly shorten the time of treatment necessary. Usually a temperature above 125° F. is preferred, and where the meal, etc. is to be filtered off, a temperature of from 135–150° F. is desirable.

The invention may also be applied in the treatment of paint oils. These and other facts set forth above emphasize the important results obtained in accordance with the present invention.

Having thus set forth my invention, I claim:

1. A product comprising a glyceride selected from the group consisting of fats and oils subject to rancidity and such percentage of solid raw soya bean material as will substantially inhibit rancidity in said glyceride.

2. A product comprising a fat subject to rancidity and such percentage of solid soya bean material selected from the group consisting of soya bean flour, soya bean meal, crushed soya bean, ground soya bean, and soya bean press cake as will substantially inhibit rancidity in said fat.

3. A product comprising an edible fat subject to rancidity and such percentage of soya bean meal as will substantially inhibit rancidity in said fat.

4. A product comprising an animal fat subject to rancidity and such percentage of soya bean meal as will substantially inhibit rancidity in said fat.

5. A product comprising a vegetable oil subject to rancidity and such percentage of soya bean meal as will substantially inhibit rancidity in said oil.

6. A product comprising lard subject to rancidity and such percentage of soya bean meal as will substantially inhibit rancidity in said lard.

7. A product comprising an edible fat subject to rancidity and such percentage of soya bean press cake as will substantially inhibit rancidity in said fat.

8. A product comprising a glyceride selected from the group consisting of fats and oils subject to rancidity and such percentage of solid raw soya bean material as will substantially inhibit rancidity in said glyceride, but not exceeding about 20% based on the amount of said glyceride.

9. A product comprising a glyceride selected from the group consisting of fats and oils subject to rancidity and such percentage of solid raw soya bean material as will substantially inhibit rancidity in said glyceride, the product however being substantially free of soya bean fiber.

10. The method of inhibiting rancidity in fats and oils normally subject to rancidity which comprises mixing a glyceride selected from the group consisting of fats and oils subject to rancidity with an amount of solid raw soya bean material sufficient to inhibit substantially rancidity in such glyceride.

11. The method of inhibiting rancidity in fats which comprises heating the fats with solid soya bean material selected from the group consisting of soya bean flour, soya bean meal, crushed soya bean, ground soya bean, and soya bean press cake, in an amount sufficient to inhibit substantially rancidity in said fats.

12. The method of inhibiting rancidity in fats which comprises infusing the fat with soya bean meal in an amount sufficient to inhibit substantially rancidity in said fat, and separating the soya bean fiber from the treated fat.

13. The method of inhibiting rancidity in glycerides which comprises infusing a glyceride selected from the group consisting of fats and oils subject to rancidity with an amount of solid raw soya bean material sufficient to inhibit substantially rancidity in such fat, the amount of soya bean material not exceeding about 20% based on the amount of glyceride.

SIDNEY MUSHER.